United States Patent
Harumoto et al.

(10) Patent No.: US 10,680,224 B2
(45) Date of Patent: Jun. 9, 2020

(54) POLYOLEFIN MULTILAYER MICROPOROUS FILM, METHOD FOR PRODUCING SAME, AND CELL SEPARATOR

(71) Applicant: TORAY INDUSTRIES, INC., Tokyo (JP)

(72) Inventors: Kosuke Harumoto, Tochigi (JP); Yukiko Miura, Tochigi (JP); Hideto Mitsuoka, Tochigi (JP)

(73) Assignee: TORAY INDUSTRIES, INC., Tokyo (JP)

( * ) Notice: Subject to any disclaimer, the term of this patent is extended or adjusted under 35 U.S.C. 154(b) by 413 days.

(21) Appl. No.: 15/318,323

(22) PCT Filed: Jun. 19, 2015

(86) PCT No.: PCT/JP2015/067774
§ 371 (c)(1),
(2) Date: Dec. 21, 2016

(87) PCT Pub. No.: WO2015/194667
PCT Pub. Date: Dec. 23, 2015

(65) Prior Publication Data
US 2017/0125766 A1    May 4, 2017

(30) Foreign Application Priority Data
Jun. 20, 2014    (JP) .................... 2014-126831

(51) Int. Cl.
*H01M 2/16*    (2006.01)
*C08J 9/28*    (2006.01)
(Continued)

(52) U.S. Cl.
CPC ............. *H01M 2/1686* (2013.01); *B32B 5/18* (2013.01); *B32B 5/32* (2013.01); *B32B 27/08* (2013.01);
(Continued)

(58) Field of Classification Search
CPC ..... H01M 2/1686; H01M 2/16; H01M 2/1653
See application file for complete search history.

(56) References Cited

U.S. PATENT DOCUMENTS

| 2009/0098465 A1 | 4/2009 | Kikuchi et al. |
| 2009/0117453 A1 | 5/2009 | Kikuchi et al. |

(Continued)

FOREIGN PATENT DOCUMENTS

| EP | 1947138 A1 | 7/2008 |
| EP | 2111914 A1 | 10/2009 |

(Continued)

OTHER PUBLICATIONS

International Search Report dated Sep. 15, 2015 from International Application No. PCT/JP2015/067774, 2 pages.
(Continued)

*Primary Examiner* — Jimmy Vo
(74) *Attorney, Agent, or Firm* — Kilpatrick Townsend & Stockton LLP (57) ABSTRACT

A polyolefin multilayer microporous membrane is disclosed. The polyolefin multilayer microporous membrane has a low air permeability value, maintains high porosity and mechanical strength even when formed into a thin film. The polyolefin multilayer microporous membrane also has excellent impedance characteristics. The polyolefin multilayer microporous membrane has excellent battery characteristics when used as a battery separator.

13 Claims, 1 Drawing Sheet

(51) Int. Cl.
*C08J 9/00* (2006.01)
*B32B 5/32* (2006.01)
*B32B 27/32* (2006.01)
*B32B 27/08* (2006.01)
*B32B 5/18* (2006.01)
*B32B 27/24* (2006.01)
*B32B 27/20* (2006.01)

(52) U.S. Cl.
CPC .............. *B32B 27/20* (2013.01); *B32B 27/24* (2013.01); *B32B 27/32* (2013.01); *C08J 9/00* (2013.01); *C08J 9/28* (2013.01); *H01M 2/16* (2013.01); *H01M 2/1653* (2013.01); *B32B 2264/025* (2013.01); *B32B 2264/0235* (2013.01); *B32B 2264/0257* (2013.01); *B32B 2264/10* (2013.01); *B32B 2264/102* (2013.01); *B32B 2264/104* (2013.01); *B32B 2266/025* (2013.01); *B32B 2266/102* (2016.11); *B32B 2270/00* (2013.01); *B32B 2307/20* (2013.01); *B32B 2307/306* (2013.01); *B32B 2307/50* (2013.01); *B32B 2307/514* (2013.01); *B32B 2307/581* (2013.01); *B32B 2307/724* (2013.01); *B32B 2307/732* (2013.01); *B32B 2457/10* (2013.01)

(56) References Cited

U.S. PATENT DOCUMENTS

| | | | |
|---|---|---|---|
| 2009/0117454 A1 | 5/2009 | Takita et al. | |
| 2009/0123822 A1 | 5/2009 | Takita et al. | |
| 2009/0123827 A1 | 5/2009 | Kono et al. | |
| 2011/0300430 A1 | 12/2011 | Usami et al. | |
| 2011/0311856 A1* | 12/2011 | Matsui | H01M 2/166 429/145 |
| 2013/0196208 A1 | 8/2013 | Nemoto | |

FOREIGN PATENT DOCUMENTS

| | | |
|---|---|---|
| JP | H03-064334 A | 3/1991 |
| JP | H06-020671 A | 1/1994 |
| JP | 2002-256099 A | 9/2002 |
| JP | 3347835 B1 | 9/2002 |
| JP | 3347854 B1 | 9/2002 |
| JP | 2010-171003 A | 8/2010 |
| JP | 2010-171006 A | 8/2010 |
| JP | WO2012/043718 A1 | 4/2012 |
| JP | 2013-224033 A1 | 10/2013 |
| JP | 2014-017275 A | 1/2014 |
| WO | WO2006/137540 | 12/2006 |
| WO | WO2009/048175 | 4/2009 |
| WO | WO2010/008003 A1 | 1/2010 |
| WO | WO2013/146403 A1 | 10/2013 |

OTHER PUBLICATIONS

Extended European Search Report for European Application No. 15809756.8, dated Jan. 16, 2018, 8 pages.

Office Action dated Jul. 2, 2019 in Japanese Patent Application No. 2016-529550, English Translation, 12 pages.

* cited by examiner

POLYOLEFIN MULTILAYER MICROPOROUS FILM, METHOD FOR PRODUCING SAME, AND CELL SEPARATOR

TECHNICAL FIELD

The present invention relates to a polyolefin multilayer microporous membrane, a production method thereof, and a battery separator. More particularly, the present invention relates to a polyolefin multilayer microporous membrane which has a low air permeability, maintains high porosity and mechanical strength even when formed into a thin film, has excellent impedance characteristics, and can be suitably used in a battery separator; a production method thereof; and a battery separator.

BACKGROUND ART

Polyolefin microporous membranes are used as battery separators in lithium primary batteries and secondary batteries, lithium polymer batteries, lithium-hydrogen batteries, lithium-cadmium batteries, silver-zinc secondary batteries, and the like, for example. A battery separator prevents short-circuiting due to contact between the active materials of both poles and forms an ion conduction pathway by holding an electrolyte solution in the pores thereof. A battery separator thus fulfills an important function from the perspectives of battery safety and battery performance (capacity, output characteristics, cycle life, or the like). Therefore, there is a demand for polyolefin porous membranes to have excellent permeability, mechanical characteristics, impedance characteristics, and the like.

For example, an aprotic electrolyte battery separator including the lamination of a polyethylene porous membrane and a polypropylene porous membrane is disclosed in Patent Document 1, and an aprotic electrolyte battery separator having a thickness of 25 µm, a maximum pore size of 0.171 µm when measured with a mercury porosimeter, a porosity of 49.5%, and a gas permeability of 1,030 (L/min·m²·kgf/cm²) is described in a working example thereof.

In addition, a multi-layer porous film comprising a porous membrane layer (layer A) containing a polyolefin resin composition (a) having a crystal melting peak temperature of not lower than 150° C. and not higher than 250° C. as a main component and having a thickness of not less than 10 µm and a nonwoven fabric layer (layer B) containing a polyolefin resin composition (b) having a crystal melting peak temperature of not lower than 100° C. and lower than 150° C. as a main component and having a fiber diameter of not greater than 1 µm is disclosed in Patent Document 2, and a film having an air permeability of from 433 to 573 sec/100 mL and a thickness of from 22 to 49 µm is described in a working example thereof.

Furthermore, a battery separator having a porous layer containing a polyolefin resin as a main component is described in Patent Document 3, and a separator having an arithmetic average roughness Ra of not less than 0.3 µm on at least one surface of the separator, an average peak-valley roughness spacing Sm of not less than 1.3 µm on at least one surface of the separator, a bubble point pore size of from 0.02 to 0.04 µm, a Gurley value (air permeability) of from 300 to 540 sec/100 mL, a thickness of from 23 to 29 µm, and a pin puncture strength of from 2.0 to 2.9 N is described in a working example thereof.

In addition, a battery separator having a porous layer containing a polyolefin resin as a main component is described in Patent Document 4, and a separator having an arithmetic average roughness Ra of from 0.46 to 0.88 µm on at least one surface of the separator, a bubble point pore size of from 0.02 to 0.04 µm, a Gurley value (air permeability) of from 330 to 600 sec/100 mL, a thickness of from 22 to 31 µm, and a piercing strength of from 2.2 to 3.1 N (224.4 to 316.3 gf) is described in a working example thereof.

Due to demands for thinner profiles in separators in response to increases in energy density and miniaturization of lithium ion rechargeable batteries in recent years, the polyolefin microporous membranes disclosed in Patent Documents 1 to 4 all have a thickness of not less than 20 µm. Therefore, there is a demand for the development of a polyolefin multilayer microporous membrane having sufficient permeability and mechanical strength even when formed into a thin film. In addition, although the impedance of a polyolefin multilayer microporous membrane ordinarily tends to decrease due to a reduction in thickness, there is a demand for improvements to achieve a higher level of impedance characteristics.

CITATION LIST

Patent Literature

Patent Document 1: Japanese Unexamined Patent Application Publication No. H06-020671A
Patent Document 2: WO/2012/043718
Patent Document 3: Japanese Unexamined Patent Application Publication No. 2010-171006A
Patent Document 4: Japanese Unexamined Patent Application Publication No. 2010-171003A

SUMMARY OF INVENTION

Technical Problem

In light of the problems of the conventional technology described above, the object of the present invention is to provide a polyolefin multilayer microporous membrane which has a low air permeability, maintains a good balance of high porosity and mechanical strength even when formed into a thin film, has outstanding impedance characteristics, and yields excellent battery characteristics when used as a battery separator; a production method thereof; and a battery separator.

Solution to Problem

As a result of conducting dedicated research in order to solve the problem described above, the present inventors discovered that the problem can be solved by a polyolefin multilayer microporous membrane comprising a first microporous layer made of a specific first polyolefin resin and a second microporous layer made of a second polyolefin resin; wherein (I) a porosity (%)/thickness (µm) and (II) an air permeability calculated in terms of a membrane thickness of 16 µm are within specific ranges. The present inventors thereby completed the present invention.

That is, the polyolefin multilayer microporous membrane of the present invention is a polyolefin multilayer microporous membrane comprising a first microporous layer and a second microporous layer; the first microporous layer comprising a first polyolefin resin containing a polypropylene; the second microporous layer comprising a second polyolefin resin containing an ultrahigh molecular weight polyethylene; and the polyolefin multilayer microporous membrane satisfying the following requirements (I) and (II):

(I) a thickness of the membrane is not greater than 25 μm, and the thickness (μm) and a porosity (%) of the membrane satisfy the relationship in Formula 1 below:

$$\text{porosity (\%)/thickness (μm)} \geq 3.0 \quad \text{(Formula 1)}$$

(II) an air permeability in terms of a membrane thickness of 16 μm is not less than 100 sec/100 cm$^3$ and not greater than 300 sec/100 cm$^3$.

In addition, the content of the polypropylene in the polyolefin multilayer microporous membrane is preferably not less than 2.0 mass % (where the total of the first and second polyolefin resins in the polyolefin multilayer microporous membrane is defined as 100 mass %).

Furthermore, it is preferable for the first polyolefin resin to contain a polypropylene in an amount of not less than 10 mass % and not greater than 55 mass % and a high-density polyethylene in an amount of not less than 45 mass % and not greater than 90 mass %, and for the second polyolefin resin to contain an ultrahigh molecular weight polyethylene in an amount of not less than 10 mass % and not greater than 60 mass % and a high-density polyethylene in an amount of not less than 40 mass % and not greater than 90 mass %.

The polyolefin multilayer microporous membrane preferably further satisfies the following requirement (III):
(III) a maximum pore size measured with a perm porometer is not less than 5 nm and not greater than 55 nm.

The polyolefin multilayer microporous membrane preferably further satisfies the following requirement (IV):
(IV) a mean flow pore size measured with a perm porometer is not less than 20 nm.

The polyolefin multilayer microporous membrane preferably further satisfies the following requirement (V):
(V) a pin puncture strength calculated in terms of a thickness of 16 μm is not less than 250 gf/16 μm.

The polyolefin multilayer microporous membrane preferably further satisfies the following requirement (VI):
(VI) a meltdown temperature according to a falling ball method is not lower than 150° C. and not higher than 190° C.

The polyolefin multilayer microporous membrane preferably further satisfies the following requirement (VII):
(VII) an impedance measured with an impedance measuring device is less than 7.5 Ω·cm$^2$.

In addition, the multi-layer porous membrane of this embodiment has a porous layer comprising an inorganic filler and/or a heat-resistant resin on at least one surface of the polyolefin multilayer microporous membrane.

Furthermore, the production method for a polyolefin multilayer microporous membrane according to the present invention is a production method for the polyolefin multi-layer microporous membrane described above comprising the steps of:

(1) preparing a first polyolefin solution by melt-kneading the first polyolefin resin containing a polypropylene and a solvent for membrane formation;
(2) preparing a second polyolefin solution by melt-kneading the second polyolefin resin containing an ultrahigh molecular weight polyethylene and a solvent for membrane formation;
(3) coextruding the first and second polyolefin solutions to form a multi-layer sheet and then cooling the multi-layer sheet to form a gel-like multi-layer sheet;
(4) a first stretching step the gel-like multi-layer sheet at not lower than 112° C. and not higher than 117° C.;
(5) removing the solvent for membrane formations from the gel-like multi-layer sheet after stretching;
(6) drying the multi-layer sheet after removing the solvent for membrane formations; and
(7) a second stretching step the multi-layer sheet after drying.

In addition, a stretching magnification (B) in the first stretching step and a stretching magnification (C) in the second stretching step preferably satisfy the relationship in Formula 4 below:

$$0.01 \leq A/(B \times C) \leq 0.35 \quad \text{(Formula 4)}$$

where A is a content of a polypropylene in the polyolefin multi-layer microporous membrane with respect to a total of 100 mass % of the first and second polyolefin resins in the polyolefin multi-layer microporous membrane.

Furthermore, the battery separator of the present invention includes the polyolefin microporous membrane described above.

In addition, the battery separator of the present invention preferably includes the multi-layer porous membrane described above.

Advantageous Effects of Invention

The polyolefin multi-layer microporous membrane of the present invention has a low air permeability, maintains a good balance of high porosity and mechanical strength even when formed into a thin film, has outstanding impedance characteristics, and yields excellent battery characteristics when used as a battery separator. In addition, with the production method for a polyolefin multi-layer microporous membrane according to the present invention, it is possible to simply and uniformly produce the polyolefin multi-layer microporous membrane described above.

DESCRIPTION OF EMBODIMENTS

1. Polyolefin Multi-Layer Microporous Membrane

The polyolefin multi-layer microporous membrane of this embodiment includes a first microporous layer containing a polypropylene and a second microporous layer containing an ultrahigh molecular weight polyethylene and has a specific (I) porosity/thickness and (II) air permeability in terms of a thickness of 16 μm. Therefore, the polyolefin multi-layer microporous membrane can be formed into a thin film having a minute pore structure with a uniform through-hole size and having a sufficient strength, which can be suitably used as a battery separator.

This embodiment will be described hereinafter with regard to each component.

(1) First Microporous Layer

The first microporous layer is composed of a first polyolefin resin containing a polypropylene. By using a polypropylene as an essential component in the first microporous layer, coarse through-holes are reduced, and the pore structure of the first microporous layer becomes minute and uniform.

Each resin component and the like constituting the first polyolefin resin will be described hereinafter.

(I) Polypropylene

The type of the polypropylene contained in the first polyolefin resin is not particularly limited, and a propylene homopolymer, a copolymer of a propylene and another α-olefin and/or a diolefin (propylene copolymer), or a mixture thereof many be used, but it is preferable to use a propylene homopolymer from the perspectives of mechanical strength and reducing the through-hole size.

A random copolymer or a block copolymer may be used as a propylene copolymer. An α-olefin having no more than 8 carbons is preferable as the α-olefin in the propylene copolymer. Examples of α-olefins having no more than 8 carbons include ethylene, butene-1, pentene-1, 4-methyl-1-pentene, octene-1, vinyl acetate, methyl methacrylate, styrene, combinations thereof, and the like. A diolefin having from 4 to 14 carbons is preferable as the diolefin in the propylene copolymer. Examples of diolefins having from 4 to 14 carbons include butadiene, 1,5-hexadiene, 1,7-octadiene, 1,9-decadiene, and the like.

The content of the other α-olefin or diolefin in the propylene copolymer is preferably less than 10 mol % per 100 mol % of the propylene copolymer.

Weight Average Molecular Weight, Molecular Weight Distribution

The weight average molecular weight (Mw) of the polypropylene is preferably not less than $6 \times 10^5$, more preferably not less than $8 \times 10^5$, and particularly preferably from $1 \times 10^6$ to $4 \times 10^6$. This is because when the Mw of the polypropylene is within the range described above, the strength, air permeability, and melt-down characteristics of the polyolefin multi-layer microporous membrane of this embodiment are excellent. In addition, the content of the polypropylene having a Mw of $5 \times 10^4$ is preferably not greater than 5 mass % per 100 mass % of the polypropylene contained in the first microporous layer.

In addition, the molecular weight distribution (Mw/Mn) of the polypropylene is preferably from 1.01 to 100, more preferably from 1.1 to 50, and even more preferably from 2.0 to 20. This is because when the weight average molecular weight of the polypropylene is within the range described above, the strength, air permeability, and melt-down characteristics of the polyolefin multi-layer microporous membrane of this embodiment are excellent. Note that Mw, Mw/Mn, and the like are values measured by the GPC method described below.

Melting Point, Heat of Fusion

The melting point of the polypropylene is preferably from 155 to 170° C. and more preferably from 160 to 165° C. from the perspective of enhancing the melt-down characteristics.

In addition, the heat of fusion $\Delta H_m$ of the polypropylene is preferably not less than 90 J/g, more preferably not less than 100 J/g, and particularly preferably not less than 110 J/g from the perspective of enhancing the melt-down characteristics and permeability.

Note that the melting point and heat of fusion are values measured with a differential scanning calorimeter (DSC) in accordance with JIS K7121.

Shape

A powdery polypropylene may be used to enhance the film-forming properties. The powdery polypropylene preferably has an average particle size of from 100 to 2,000 μm and a particle size distribution of from 50 to 3,000. Here, the average particle size and particle size distribution can be measured in accordance with JIS K0069.

Polypropylene Content

The lower limit of the content of the polypropylene in the first polyolefin resin is preferably not less than 10 mass %, more preferably not less than 11 mass %, and even more preferably not less than 15 mass % per 100 mass % of the entire first polyolefin resin. In addition, the upper limit thereof is not greater than 55 mass %, more preferably not greater than 50 mass %, and even more preferably not greater than 35 mass %. Furthermore, the lower limit of the content of the polypropylene in the polyolefin microporous membrane is preferably not less than 2.0 mass %, more preferably not less than 2.5 mass %, and even more preferably not less than 3.0 mass % per 100 mass % of the total of the first and second polyolefin resins contained in the polyolefin microporous membrane. In addition, the upper limit thereof is less than 15 mass %, more preferably less than 12 mass %, and even more preferably not greater than 11 mass %. When the content of the polypropylene is within the range described above, the polyolefin multi-layer microporous membrane of this embodiment becomes a thin film having high porosity and strength and having a uniform and minute pore structure. In addition, from the perspective of heat resistance, the content of the polypropylene in the polyolefin microporous membrane is preferably not less than 2.5 mass % and less than 12 mass %, and more preferably not less than 3.0 mass % and not greater than 11 mass %. By setting the content of the polypropylene to within the range described above, the meltdown temperature of the polyolefin microporous membrane increases to at least the melting point of the first polyolefin resin containing a polypropylene, and the heat resistance is markedly enhanced.

(ii) Polyethylene

The first polyolefin resin may contain a polyethylene. The polyethylene is preferably a polyethylene other than an ultrahigh molecular weight polyethylene having a Mw of not less than $1 \times 10^6$ and is more preferably at least one type selected from the group consisting of high-density polyethylenes, medium-density polyethylenes, branched low-density polyethylenes, and linear low-density polyethylenes. A high-density polyethylene (density: 0.920 to 0.970 g/m³) is even more preferably used.

In addition, the weight average molecular weight (Mw) of the polyethylene is preferably not less than $1 \times 10^4$ and less than $1 \times 10^6$, more preferably from not less than $1 \times 10^5$ to $9 \times 10^5$, and even more preferably from not less than $2 \times 10^5$ to $8 \times 10^5$. When the Mw of the polyethylene is within the range described above, the appearance of the polyolefin multi-layer microporous membrane of this embodiment becomes excellent, and it is possible to reduce the through-hole size.

In addition, the molecular weight distribution (Mw/Mn) of the polyethylene is preferably from 1.0 to 20 and more preferably from 3.0 to 10.0, from the perspective of extrusion formability and physical property control by means of stable crystallization control.

Furthermore, the polyethylene is not limited only to an ethylene homopolymer and may be an ethylene copolymer containing a small amount of another α-olefin such as propylene, butene-1, hexene-1, pentene-1, 4-methylpentene-1, octene, vinyl acetate, methyl methacrylate, or styrene. Such a copolymer is preferably produced with a single-site catalyst.

Polyethylene Content

The lower limit of the content of the polyethylene in the first polyolefin resin is preferably not less than 45 mass %, more preferably not less than 50 mass %, and even more preferably not less than 65 mass % per 100 mass % of the entire first polyolefin resin. In addition, the upper limit thereof is preferably not greater than 90 mass %, more preferably not greater than 89 mass %, and even more preferably not greater than 85 mass %. When the polyethylene content is within the range described above, the composition has good melt-extrusion characteristics and excellent uniform stretching characteristics.

(iii) Other Resin Components

The first polyolefin resin may contain resin components other than the polypropylene and polyethylene described above as necessary. A preferable example of the other resin components is a heat-resistant resin, and examples of the heat-resistant resins include crystalline resins (including partially crystalline resins) having a melting point of not lower than 150° C. and/or amorphous resins having a glass transition point (Tg) of not lower than 150° C. Here, Tg is a value measured in accordance with JIS K7121.

Specific examples of the other resin components include polyesters, polymethylpentenes (PMP or TPX (transparent polymer X), melting point: 230 to 245° C.), polyamides (PA, melting point: 215 to 265° C.), polyarylene sulfides (PAS), fluorine-containing resins such as vinylidene fluoride homopolymers such as polyvinylidene fluoride (PVDF) or fluorinated olefins such as polytetrafluoroethylene (PTFE) and copolymers thereof; polystyrenes (PS, melting point: 230° C.), polyvinyl alcohols (PVA, melting point: 220 to 240° C.), polyimides (PI, Tg: not less than 280° C.), polyamideimides (PAI, Tg: 280° C.), polyether sulfones (PES, Tg: 223° C.), polyether ether ketones (PEEK, melting point: 334° C.), polycarbonates (PC, melting point: 220 to 240° C.), cellulose acetate (melting point: 220° C.), cellulose triacetate (melting point: 300° C.), polysulfones (Tg: 190° C.), and polyether imides (melting point: 216°), and the like. The resin components are not limited to a single resin component and may include a plurality of resin components. A preferable Mw of the other resin components differs depending on the type of the resin but is typically from $1 \times 10^3$ to $1 \times 10^6$ and is more preferably from $1 \times 10^4$ to $7 \times 10^5$. In addition, the content of the other resin components in the first polyolefin resin is adjusted appropriately within a range that does not depart from the gist of this embodiment, but the content is preferably within the range of approximately not greater than 45 mass % per 100 mass % of the entire first polyolefin resin.

Furthermore, a polyolefin other than the polyethylene described above may be contained as necessary as the other resin components, and at least one type selected from the group consisting of polybutene-1, polypentene-1, polyhexene-1, and polyoctene-1 having a Mw of from $1 \times 10^4$ to $4 \times 10^6$ and polyethylene waxes having a Mw from $1 \times 10^3$ to $1 \times 10^4$ may be used. The content of the polyolefin other than the polyethylene described above may be adjusted appropriately within a range that does not diminish the effect of this embodiment, but the content is preferably not greater than 20 mass %, more preferably not greater than 10 mass %, and even more preferably less than 5 mass % per 100 mass % of the entire second polyolefin resin.

In addition, a small amount of ultrahigh molecular weight polyethylene may also be contained as the other resin components within a range that does not diminish the effect of this embodiment. The content of the ultrahigh molecular weight polyethylene may be, for example, in a range of from 0 to 30 mass %, preferably from 0 to 15 mass % and more preferably from 0 to 10 mass %, and may also be 0 mass % per 100 mass % of the entire first polyolefin resin.

(2) Second Microporous Layer

Since the polyolefin multi-layer microporous membrane of this embodiment contains a second microporous layer including a second polyolefin resin containing an ultrahigh molecular weight polyethylene, the polyolefin multi-layer microporous membrane has excellent forming stability as well as excellent mechanical strength, porosity, and air permeability when formed into a thin film.

Each resin component constituting the second polyolefin resin will be described hereinafter.

(i) Ultrahigh Molecular Weight Polyethylene

The mass average molecular weight (Mw) of the ultrahigh molecular weight polyethylene contained in the second polyolefin resin is not less than $1 \times 10^6$, preferably from $1 \times 10^6$ to $8 \times 10^6$, and more preferably from $1.2 \times 10^6$ to $3 \times 10^6$. When the Mw is within the range described above, the formability of the polyolefin multi-layer porous membrane of this embodiment is excellent.

Note that Mw is a value measured by gel permeation chromatography (GPC) described below.

The ultrahigh molecular weight polyethylene is not particularly limited within a range that satisfies the Mw described above, and a conventionally known substance may be used. The ultrahigh molecular weight polyethylene is not limited to an ethylene homopolymer, and an ethylene/α-olefin copolymer containing a small amount of another α-olefin may also be used.

Preferred examples of α-olefins other than ethylene include propylene, butene-1, pentene-1, hexene-1, 4-methylpentene-1, octene-1, vinyl acetate, methyl methacrylate, styrene, and the like. The content of the α-olefin other than ethylene is preferably not greater than 5 mol %.

One type of ultrahigh molecular weight polyethylene may be used alone, or two or more types may be used in combination. For example, two or more types of ultrahigh molecular weight polyethylenes having different Mw may be mixed and used.

Ultrahigh Molecular Weight Polyethylene Content

The lower limit of the content of the ultrahigh molecular weight polyethylene in the second polyolefin resin is preferably not less than 10 mass %, more preferably not less than 20 mass %, and even more preferably not less than 25 mass % per 100 mass % of the entire second polyolefin resin. In addition, the upper limit thereof is preferably not greater than 60 mass %, more preferably not greater than 50 mass %, and even more preferably not greater than 45 mass %. When the ultrahigh molecular weight polyethylene content is within the range described above, it is possible to achieve high mechanical strength and high porosity when the polyolefin multi-layer microporous membrane is formed into a thin film.

(ii) Polyethylene

The second polyolefin resin may contain a polyethylene other than an ultrahigh molecular weight polyethylene. The same polyethylenes as the polyethylenes contained in the first polyolefin resin described above may be used as polyethylenes other than an ultrahigh molecular weight polyethylene, but a high-density polyethylene (density: 0.920 to 0.970 g/m$^3$) may be preferably used. However, the composition of the polyethylene used in the second polyolefin resin may be same as or different from the composition of the polyethylene contained in the first polyolefin resin and may be selected appropriately in accordance with the desired physical properties.

The lower limit of the content of the resin components other than the ultrahigh molecular weight polyethylene in the ethylene resin described above is preferably not less than 40 mass % and more preferably not less than 50 mass % per 100 mass % of the entire second polyolefin resin. In addition, the upper limit thereof is preferably not greater than 90 mass % and more preferably less than 80 mass %. In particular, containing a high-density polyethylene having a Mw not less than $2\times10^5$ and less than $8\times10^5$ yields good melt-extrusion characteristics and excellent uniform stretching characteristics.

(iii) Other Resin Components

As in the case of the first polyolefin resin, the second polyolefin resin may contain other resin components as necessary. Specifically, the same components as in "(I) (iii) Other resin components" above may be used.

Note that one type of resin component other than an ultrahigh molecular weight polyethylene may be used alone, or two or more types may be used in combination. For example, two or more types of high-density polyethylenes, medium-density polyethylenes, or low-density polyethylenes having different Mw may be mixed and used.

In addition, a small amount of polypropylene may also be contained as the other resin components within a range that does not diminish the effect of this embodiment. The content of the polypropylene is, for example, preferably less than from 0 to 5 mass %, more preferably less than 2 mass %, even more preferably in the range of less than 1 mass %, and may also be 0 mass % per 100 mass % of the entire second polyolefin resin.

(3) Polyolefin Multi-Layer Microporous Membrane (i) First Microporous Layer and Second Microporous Layer The polyolefin multi-layer microporous membrane of this embodiment includes a first microporous layer and a second microporous layer and preferably has a three-layer structure in the order of a first microporous layer/second microporous layer/first microporous layer or a second microporous layer/first microporous layer/second microporous layer.

Since the polyolefin multilayer microporous membrane of this embodiment has a multilayer structure as described above, the polyolefin multilayer microporous membrane has a higher meltdown temperature and a higher porosity than a single-layer polyolefin microporous membrane and has the excellent property of easily making the maximum pore size small. In particular, since the first microporous layer has a minute and uniform pore structure, the ion pathways of a battery separator including the polyolefin multilayer microporous membrane of this embodiment can be uniformly dispersed in the in-plane direction of the separator, so local dendrite growth is suppressed, and an enhancement in the safety of the battery at the time of repeated charging and discharging can be expected.

When composed of a plurality of layers, the composition of the first or second microporous layer may be the same or different for each layer but is preferably the same.

Furthermore, the polyolefin multilayer microporous membrane may be provided with layers other than the first and second microporous layers to form a structure with three or more layers as necessary.

The thickness of each layer of the polyolefin multilayer microporous membrane of this embodiment is not particularly limited, but the ratio of the first porous layer/second porous layer (solid content ratio) is preferably from 90/10 to 10/90 and more preferably from 80/20 to 20/80.

(ii) Each Characteristic

Thickness

In addition, the thickness of the polyolefin multilayer microporous membrane of this embodiment is not greater than 25 μm. Furthermore, the lower limit of the thickness is preferably not less than 1 μm, more preferably not less than 2 μm, and even more preferably not less than 3 μm. In addition, the upper limit thereof is preferably not greater than 18 μm, more preferably not greater than 16 μm, and even more preferably not greater than 15 μm. When the thickness is within the range described above, the battery capacity is enhanced when the polyolefin multilayer microporous membrane of this embodiment is used as a battery separator. The thickness can be adjusted to within the range described above by appropriately adjusting the discharge rate from the T-die, the revolution speed of the cooling roll, the line speed, the stretching magnification, and the like, for example.

In particular, in the polyolefin multilayer microporous membrane of this embodiment, as described below, it is preferable to adjust the stretching magnification in accordance with the polypropylene content so as to control the pore structure of the membrane. Thus, when the desired thickness cannot be achieved by simply adjusting the stretching magnification, the desired thickness can be achieved by appropriately adjusting the discharge rate from the T-die, the revolution speed of the cooling roll, the line speed, and the like.

Porosity/Thickness

The physical properties of a polyolefin fine porous membrane such as the thickness or strength are ordinarily adjusted by stretching the porous membrane. However, when the stretching magnification is made large with a thickness of less than 20 μm, for example, it was determined that the density of the microporous membrane may increase, which makes it difficult to achieve both a reduction in membrane thickness and a high porosity. The tendency for pores becoming easily crushed by stretching as the membrane becomes increasingly thin may be considered as one of the cause. Therefore, the polyolefin microporous membrane of this embodiment achieves both a high level of thickness reduction and high porosity by setting the content of the resin components of each layer to within specific ranges and appropriately adjusting the stretching magnification or the like in the first and second stretching steps described below.

That is, the thickness (μm) and porosity (%) of the polyolefin multilayer microporous membrane of this embodiment satisfy the relationship in Formula (1) below, preferably satisfy the relationship in Formula (2) below, and more preferably satisfy the relationship in Formula (3) below.

$$\text{Porosity (\%)/thickness (μm)} \geq 3.0 \quad (1)$$

$$\text{Porosity (\%)/thickness (μm)} \geq 3.5 \quad (2)$$

$$\text{Porosity (\%)/thickness (μm)} \geq 3.8 \quad (3)$$

By satisfying the above formulae, the polyolefin multilayer microporous membrane has sufficient porosity even when formed into a thin film, which yields excellent electrolyte retention and reduced impedance when the multilayer microporous membrane is used as a battery separator. In addition, it becomes possible to increase the number of laminated layers when the membrane is laminated with a polar plate as a battery, which makes it possible to increase the battery capacity. Note that the upper limit of the porosity (%)/thickness (μm) is not particularly limited but is approximately 9.

In addition, the value of the porosity (%)/thickness (μm) can be set to within the range described above by adjusting the content of the resin components of each layer, the stretching magnifications in the first and second stretching steps described below, and the like.

Furthermore, the porosity of the polyolefin multilayer microporous membrane of this embodiment is preferably from 30 to 70% and more preferably from 40 to 60%.

The porosity can be set to within the range described above, even with a small thickness, by adjusting the content of the resin components of each layer, the stretching magnifications in the first and second stretching steps described below, and the like.

Note that the thickness and the porosity are values measured with the methods described in the working examples described below.

Air Permeability

The air permeability of the polyolefin multilayer microporous membrane of this embodiment is not less than 100 sec/100 cm$^3$ and not greater than 300 sec/100 cm$^3$ when calculated in terms of a thickness of 16 μm. In addition, the upper limit thereof is preferably not greater than 280 sec/100 cm$^3$ and more preferably not greater than 250 sec/100 cm$^3$. When the air permeability is within the range described above, the ion permeability is excellent, the impedance decreases, and the battery output is enhanced when used as a battery separator. The air permeability can be set to within the range described above by adjusting the stretching conditions of the gel-like sheet and the multilayer microporous membrane after drying, within a range in which the polypropylene that is used does not depart from the range described above.

Note that the air permeability is a value measured with the method described in the working examples described below.

Maximum Pore Size

The maximum pore size of the polyolefin multilayer microporous membrane of this embodiment measured in the order of Dry-up and Wet-up using a perm porometer is preferably not less than 5 nm and not greater than 55 nm. The lower limit of the maximum pore size is preferably not less than 5 nm, more preferably not less than 15 nm, and even more preferably not less than 20 nm. The upper limit of the maximum pore size is not greater than 55 nm, preferably not greater than 53 nm, and more preferably not greater than 50 nm.

Note that the pore size measured with a perm porometer refers to the pore size of through-holes in the membrane, and the maximum pore size is also called the bubble point pore size. When the maximum pore size is within the range described above, the composition has a minute pore structure with high through-hole size uniformity. The ion pathways of a battery separator having such a pore structure can be dispersed uniformly in the in-plane direction of the separator. In addition, when used as a battery separator, the cycle life of the battery can be enhanced by suppressing local clogging or dendrite growth. Furthermore, an enhancement in the safety of the battery or an enhancement in output characteristics can also be anticipated. The maximum pore size can be set to within the range described above by setting the propylene contents in the first and second polyolefin resins to within the ranges described above and appropriately adjusting the stretching or the like in the first and second stretching steps described below.

Note that the maximum pore size is a value measured with the method described in the working examples described below.

Mean Flow Pore Size

The lower limit of the mean flow pore size of the polyolefin multilayer microporous membrane of this embodiment measured in the order of Dry-up and Wet-up using a perm porometer is preferably not less than 20 nm, and the upper limit of the mean flow pore size is preferably not greater than 40 nm. In a battery separator having a mean flow pore size within the range described above, increases in impedance or decreases in air permeability and porosity are suppressed, and enhancements in battery capacity and output can be anticipated. The average pore size can be set to within the range described above by setting the propylene contents in the first and second polyolefin resins to within the ranges described above and appropriately adjusting the stretching magnification or the like in the first and second stretching steps described below.

In addition, the lower limit of the ratio of the maximum pore size to the mean flow pore size described above (maximum pore size/mean flow pore size) is preferably not less than 1.0. Furthermore, the upper limit thereof is not particularly limited but is preferably not greater than 1.7 and more preferably not greater than 1.6. When the value is within the range described above, it is possible to achieve a structure with pores (through-holes) of higher uniformity.

Note that the average pore size is a value measured with the method described in the working examples described below.

Pin Puncture Strength

The pin puncture strength of the polyolefin multilayer microporous membrane of this embodiment calculated in terms of a thickness of 16 μm is preferably not less than 250 gf/μm, more preferably not less than 280 gf/16 μm, even more preferably not less than 300 gf/16 μm, and even more preferably not less than 320 gf/16 μm. The upper limit of the pin puncture strength is not particularly limited but is approximately 800 gf/16 When the pin puncture strength is within the range described above, the mechanical strength is excellent even when formed into a thin film, and membrane puncture and shorting due to impact are prevented when used as a battery separator, which yields excellent safety.

The pin puncture strength can be controlled to within the range described above by adjusting the polypropylene content of the first layer, the ultrahigh molecular weight polyethylene content of the second layer, the stretching magnifications in the first and second stretching steps, and the like.

Note that the pin puncture strength is a value measured with the method described in the working examples described below.

Meltdown Temperature

The lower limit of the meltdown temperature of the polyolefin multilayer microporous membrane of this embodiment is preferably not lower than 150° C., more preferably not lower than 160° C., even more preferably not lower than 165° C., and even more preferably not lower than 170° C. In addition, the upper limit of the meltdown temperature is preferably not higher than 190° C. When the meltdown temperature is within the range described above, the heat resistance is superior.

The meltdown temperature can be enhanced by including a polypropylene having a higher melting point than that of polyethylene in the polyolefin multilayer microporous membrane, but the meltdown temperature can be set to within a range of not lower than the melting point of the resin containing the polypropylene by adjusting the content of the polypropylene of the first layer or appropriately adjusting the thickness ratio of the first layer/second layer.

Note that the meltdown temperature is a value measured with the method described in the working examples described below.

Impedance

The upper limit of the impedance of the polyolefin multilayer microporous membrane of this embodiment measured with an impedance measuring device is preferably less than 7.5 Ω·cm², more preferably less than 7.4 Ω·cm², and even more preferably not greater than 7.3 Ω·cm². The lower limit of the impedance is preferably not less than 1.0 Ω·cm². When the impedance is within the range described above, the output characteristics are excellent when used as a battery separator.

The impedance can be set to within the range described above by adjusting the content of the resin components of each layer to within the ranges described above and then adjusting the stretching magnifications or the like in the first and second stretching steps described below.

Note that the impedance is a value measured with the method described in the working examples described below.

The increase rate of the solution resistance of the polyolefin multilayer microporous membrane of this embodiment after an accelerated aging test is preferably less than 200%, more preferably less than 150%, and even more preferably less than 100%. When the increase rate of the solution resistance is within the range described above, an excellent battery cycle life can be anticipated when used as a battery separator.

The increase rate of the solution resistance after an accelerated aging test is a value measured with the method described in the working examples described below.

2. Production Method for Polyolefin Multilayer Microporous Membrane

First Method

The production method for the polyolefin multilayer microporous membrane of this embodiment is not particularly limited as long as a polyolefin multilayer microporous membrane having the characteristics described above can be produced, and conventionally known methods may be used. For example, the methods described in the specifications of Japanese Patent No. 2132327B and Japanese Patent No. 3347835B, WO/2006/137540, and the like can be used. Specifically, a first production method preferably includes the following steps (1) to (7) and may also include the following step (8) and/or (9):

(1) preparing a first polyolefin solution by melt-kneading the first polyolefin resin containing a polypropylene and a solvent for membrane formation;
(2) preparing a second polyolefin solution by melt-kneading the second polyolefin resin containing an ultrahigh molecular weight polyethylene and a solvent for membrane formation;
(3) coextruding the first and second polyolefin solutions so as to form a multilayer sheet and then cooling the multilayer sheet to form a gel-like multilayer sheet;
(4) a first stretching step of stretching the gel-like multilayer sheet;
(5) removing the solvent for membrane formation from the gel-like multilayer sheet after stretching;
(6) drying the multilayer sheet after removing the solvent for membrane formation;
(7) a second stretching step of stretching the multilayer sheet after drying;
(8) heat-treating the multilayer sheet after drying;
(9) performing crosslinking treatment and/or hydrophilization treatment on the multilayer sheet after the stretching step.

In particular, in step (3), by simultaneously extruding the first and second polyolefin solutions with a multilayer die under specific conditions so as to form a multilayer sheet, it is possible to produce a polyolefin multilayer microporous membrane having excellent adhesion between layers, having an excellent meltdown temperature, mechanical strength, permeability, and porosity that could not be achieved with a single layer when used as a battery separator and having a small maximum pore size. In addition, it is possible to achieve good porosity and control of the micropore structure, even with a small thickness, by using the resin materials described above in steps (1) and (2) and then stretching the membrane under appropriate temperature conditions in steps (4) and (7).

Furthermore, from the perspective of achieving better porosity and controlling the micropore structure when formed into a thin film, the stretching magnification (B) in the first stretching step and the stretching magnification (C) in the second stretching step preferably satisfy the relationship in Formula 4 below and more preferably satisfy the relationship in Formula 5 below.

$$0.01 \leq A/(B \times C) \leq 0.35 \quad \text{(Formula 4)}$$

$$0.04 \leq A/(B \times C) \leq 0.30 \quad \text{(Formula 5)}$$

(In the formulae, A is the content of polypropylene in the polyolefin multilayer microporous membrane with respect to a total of 100 mass % of the first and second polyolefin resins in the polyolefin multilayer microporous membrane.)

As also illustrated in the working examples of this application, when the propylene content in the microporous membrane is large, the pore size (maximum pore size, mean flow pore size) tends to become small. Therefore, when the propylene content is increased, the pore size may become too small, and the value of the air permeability or the impedance may increase, which may cause the output characteristics or the cycle life of the battery to be insufficient when used as a battery separator.

Accordingly, a minute and highly uniform micropore structure having good heat resistance can be achieved by setting the stretching magnifications (B) and (C) to within the ranges of the above formulae in accordance with the polypropylene content.

Furthermore, since the content of the polypropylene contained in the first polyolefin resin substantially affects the micropore structure of the multilayer microporous membrane, the stretching magnification (B) in the first stretching step and the stretching magnification (C) in the second stretching step preferably satisfy the relationship in Formula 6 below and even more preferably satisfy the relationship in Formula 7 below.

$$0.06 \leq D/(B \times C) \leq 1.70 \quad \text{(Formula 6)}$$

$$0.10 \leq D/(B \times C) \leq 1.50 \quad \text{(Formula 7)}$$

(In the formulae, D is the content of polypropylene with respect to 100 mass % of the entire first polyolefin resin.)

By satisfying the above formulae, it is possible to achieve better porosity and to control the micropore structure when formed into a thin film.

Each step will be described hereinafter.

(1) Preparation of First and Second Polyolefin Solutions

After a suitable solvent for membrane formation is added to each of the first polyolefin resin and the second polyolefin resin, the mixture is melt-kneaded to respectively prepare first and second polyolefin solutions. Methods using a twin-screw extruder described in the specifications of Japanese Patent No. 2132327B and Japanese Patent No. 3347835B can be used as a melt-kneading method. Since melt-kneading methods are publicly known, explanation is omitted.

The compounding ratio of the first polyolefin resin or the second polyolefin resin to the solvent for membrane formation in the first polyolefin solution is not particularly limited, but the content of the solvent for membrane formation is preferably from 70 to 80 parts by mass per 20 to 30 parts by mass of the first polyolefin resin or the second polyolefin resin. When the ratio of the first or second polyolefin resin is within the range described above, it is possible to prevent swelling or neck-in formation at the die outlet when the first or second polyolefin solution is extruded, which yields good formability and self-supporting characteristics of the extruded compact (gel-like compact).

(2) Gel-Like Sheet Forming Step

From extruders, each of the first and second polyolefin solutions are separately fed to a die, and both of these solutions are combined in a layered-form in the die and then extruded in a sheet shape.

The extrusion method may be the flat die method or the inflation method. In both methods, a method in which the solutions are respectively fed to manifolds and laminated in the layered-form at the lip entrance of a die for forming multilayer (multiple manifold method), or a method in which the solutions are formed into a layered flow in advance to be fed to a die (block method) can be used. Since the multiple manifold method and the block method are publicly known, detailed explanation of these is omitted. The gap of the flat die for multilayer is from 0.1 to 5 mm. The extrusion temperature is preferably from 140 to 250° C., and the extrusion rate is preferably from 0.2 to 15 m/min. The ratio of the thicknesses of the first and second microporous layers can be controlled by adjusting the extruded amount of each of the first and second polyolefin solutions.

Methods disclosed in Japanese Patent No. 2132327B and Japanese Patent No. 3347835B can be used as an extrusion method.

A gel-like multilayer sheet is formed by cooling the resulting laminated and extruded compact. Methods disclosed in Japanese Patent No. 2132327B and Japanese Patent No. 3347835B can be used as a method of forming a gel-like sheet. Cooling is preferably performed at a rate of not less than 50° C./min up to at least the gelation temperature. Cooling is preferably performed up to not higher than 25° C. By cooling, the microphases of the first and second polyolefins that are separated by the solvent for membrane formation can be immobilized. When the cooling rate is within the range described above, the crystallinity is maintained within a moderate range, resulting in a gel-like multilayer sheet suitable for stretching. A method of bringing into contact with a cooling medium, such as cold air and cooling water, a method of bringing into contact with a cooling roll, and the like can be used as a cooling method, but it is preferable to cool the sheet by bringing the sheet into contact with a roll cooled with a cooling medium.

(3) First Stretching Step

Next, the obtained gel-like multilayer sheet is stretched in at least a uniaxial direction. Since the gel-like multilayer sheet contains a solvent for membrane formation, the gel-like multilayer sheet can be stretched uniformly. The gel-like multilayer sheet is preferably stretched at a prescribed magnification by a tenter method, a roll method, an inflation method, or a combination thereof after heating. Stretching may be uniaxial stretching or biaxial stretching, but biaxial stretching is preferable. In the case of biaxial stretching, simultaneous biaxial stretching, sequential stretching, or multi-stage stretching (for example, a combination of simultaneous biaxial stretching and sequential stretching) may be used.

The stretching magnification (area stretching magnification) in this step is preferably not less than 2 and more preferably from 3 to 30 in the case of uniaxial stretching. In the case of biaxial stretching, the stretching magnification is preferably not less than 9, more preferably not less than 16, and particularly preferably not less than 25. In addition, a stretching magnification of not less than 3 is preferable in both the machine and transverse directions (MD and TD directions), and the stretching magnifications in the MD direction and the TD direction may be same as or different from one another. When the stretching magnification is set to not less than 9, an enhancement in the pin puncture strength can be anticipated. Note that the stretching magnification in this step refers to the area stretching magnification of the microporous membrane immediately prior to being used in the next step, using the microporous membrane immediately prior to this step as a reference. In addition, the stretching magnification more preferably satisfies the relationships in any one or more of Formulae 2 to 5 below within the range of the stretching magnification described above. The stretching temperature in this step is preferably set to within the range of from the crystalline dispersion temperature (Tcd) of the second polyolefin resin to Tcd+30° C., more preferably within the range of from the crystalline dispersion temperature (Tcd)+5° C. to the crystalline dispersion temperature (Tcd)+28° C., and particularly preferably within the range of from Tcd+10° C. to Tcd+26° C. When the stretching temperature is within the range described above, membrane puncture due to the stretching of the second polyolefin resin is suppressed, and stretching can be performed with a high magnification.

The crystalline dispersion temperature (Tcd) is determined by temperature-characteristic measurement of the dynamic viscoelasticity in accordance with ASTM D4065. The ultrahigh molecular weight polyethylene, the polyethylene other than the ultrahigh molecular weight polyethylene, and the polyethylene composition have a crystalline dispersion temperature of approximately 90 to 100° C., so the lower limit of the stretching temperature is preferably not lower than 90° C., more preferably not lower than 110° C., even more preferably not lower than 112° C., and even more preferably not lower than 114° C. In addition, the upper limit of the stretching temperature is preferably not higher than 130° C., more preferably not higher than 120° C., and even more preferably not higher than 117° C.

Such stretching causes cleavage between polyethylene lamella layers, and the polyethylene phase becomes finer, forming a large numbers of fibrils. The fibrils form a mesh structure with three-dimensional irregular linkages. The mechanical strength is enhanced and the pores expand due to stretching, but when stretching is performed under appropriate conditions, it becomes possible to control the through-hole size and to yield a high porosity with an even smaller thickness. Therefore, the membrane is suitable for a safer and higher-performance battery separator.

Depending on the desired physical properties, the stretching may be performed while the temperature distribution is present in a membrane thickness direction. Thereby, a multilayer microporous membrane having even more excellent mechanical strength can be obtained. The details of this method are described in Japanese Patent No. 3347854B.

(4) Removal of Solvent for Membrane Formation

The solvent for membrane formation is removed (washed) using a washing solvent. The first and second polyolefin phases are separated from the phase of the solvent for membrane formation, so when the solvent for membrane formation is removed, a porous membrane including fibrils forming a fine three-dimensional network structure and having pores (voids) which communicate three-dimensionally and irregularly is obtained. Washing solvents and methods of removing the solvent for membrane formation using the washing solvent has been publicly known, and thus explanation is omitted. For example, methods disclosed in Japanese Patent No. 2132327B or Japanese Unexamined Patent Application Publication No. 2002-256099A can be used.

(5) Drying

The multilayer microporous membrane from which the solvent for membrane formation has been removed is dried by a heat-drying or an air-drying. The drying temperature is preferably not higher than the crystalline dispersion temperature (Tcd) of the second polyolefin resin and is particularly preferably at least 5° C. lower than the Tcd. Drying is preferably performed until the residual washing solvent is not greater than 5 mass % and more preferably not greater than 3 mass % on the basis of 100 mass % (dry weight) of the multilayer microporous membrane. When the residual washing solvent is within the range described above, the porosity of the multilayer microporous membrane is maintained and the diminishing of permeability is suppressed when the multilayer microporous membrane is subjected to the subsequent stretching steps and the heat-treatment step.

(6) Second Stretching Step

The multilayer microporous membrane after drying is preferably stretched in at least a uniaxial direction. The stretching of the multilayer microporous membrane can be performed by a tenter method or the like in the same manner as described above while heating. Stretching may be uniaxial stretching or biaxial stretching. In the case of biaxial stretching, simultaneous biaxial stretching or sequential stretching may be used, but simultaneous biaxial stretching is preferable.

The stretching temperature in this step is not particularly limited but is ordinarily from 90 to 135° C. and more preferably from 95 to 130° C.

The lower limit of the stretching magnification (area stretching magnification) in the uniaxial direction at the time of the stretching of the multilayer microporous membrane in this step is preferably not less than 1.0, more preferably not less than 1.1, and even more preferably not less than 1.2. In addition, the upper limit is preferably not greater than 1.8. In the case of uniaxial stretching, the stretching magnification is from 1.0 to 2.0 in the MD direction or the TD direction. In the case of biaxial stretching, the lower limit of the area stretching magnification is preferably not less than 1.0, more preferably not less than 1.1, and even more preferably not less than 1.2. The upper limit is preferably not greater than 3.5. The stretching magnifications in the MD direction and the TD direction may respectively be set to from 1.0 to 2.0, and the stretching magnifications in the MD direction and the TD direction may be same as or different from one another. Note that the stretching magnification in this step refers to the stretching magnification of the microporous membrane immediately prior to being used in the next step using the microporous membrane immediately prior to this step as a reference.

In addition, the stretching magnification more preferably satisfies the relationships in any one or more of Formulae 2 to 5 below within the range of the stretching magnification described above.

(8) Heat Treatment

In addition, the multilayer microporous membrane after drying may be subjected to heat treatment. Heat treatment causes crystal stabilization and lamella uniformization. Heat setting treatment and/or heat relaxation treatment may be used as a heat treatment method. The heat setting treatment is a heat treatment that heats in a manner that the size of a membrane is maintained and not changed. The heat relaxation treatment is a heat treatment in which the membrane is thermally shrunk in the MD direction and/or TD direction during the heating. Heat setting treatment is preferably performed by a tenter method or a roll method. For example, a method disclosed in Japanese Unexamined Patent Application Publication No. 2002-256099A can be exemplified as the heat relaxation treatment method. The heat treatment temperature is preferably within the range of from Tcd to Tm of the second polyolefin resin, more preferably within the range of ±5° C. of the stretching temperature of the multilayer microporous membrane, and particularly preferably within the range of ±3° C. of the second stretching temperature of the multilayer microporous membrane.

(9) Crosslinking Treatment, Hydrophilization Treatment

In addition, the multilayer microporous membrane after bonding or stretching may be further subjected to crosslinking treatment and hydrophilization treatment.

For example, crosslinking treatment is performed by irradiating the multilayer microporous membrane with ionizing radiation such as α-rays, β-rays, γ-rays, or an electron beam. In the case of electron beam irradiation, an electron beam dose of from 0.1 to 100 Mrad is preferable, and an acceleration voltage of from 100 to 300 kV is preferable. The meltdown temperature of the multilayer microporous membrane increases due to crosslinking treatment.

In addition, hydrophilization treatment can be performed by monomer graft, surfactant treatment, corona discharge and the like. Monomer graft is preferably performed before the crosslinking treatment.

Second Production Method

In addition, a second production method includes the following steps (1) to (7) and may also optionally include the following step (8).

(1) preparing first and second polyolefin solutions by melt-kneading the raw materials constituting each layer (second polyolefin resin and first polyolefin resin) and a solvent for membrane formation;

(2) separately extruding the first and second polyolefin solutions from a die via an extruder and cooling the solutions to form first and second gel-like sheets;

(3) first stretching step of stretching the first and second gel-like sheets;

(4) laminating the first and second gel-like sheets after stretching to form a gel-like multilayer sheet;

(5) removing the solvent for membrane formation from the gel-like multilayer sheet;

(6) drying the multilayer sheet after removing the solvent for membrane formation; and (7) a second stretching step of stretching the multilayer sheet after drying;

(8) performing crosslinking treatment and/or hydrophilization treatment on the multilayer sheet after the second stretching step.

Steps (1) to (3) and (5) to (8) in the second method may be performed under the same conditions as those of each step in the first method described above. Step (4) is not particularly limited, and a conventionally known method may be used.

3. Multi-Layer Porous Membrane

In addition, another layer in addition to the first or second microporous layer may be provided on at least one surface of the polyolefin multilayer microporous membrane so as to form a multi-layer porous membrane. An example of another layer is a porous layer formed using a filler-containing resin solution containing a filler and a resin binder or a heat-resistant resin solution.

An example of the filler is an inorganic filler or an organic filler such as a crosslinked polymer filler, and a filler that has a melting point of not lower than 200° C., has high electrical insulating properties, and is electrochemically stable within the scope of use of a lithium ion rechargeable battery. Examples of such an inorganic filler include oxide-based ceramics such as alumina, silica, titania, zirconia, magnesia, ceria, yttria, zinc oxide, and iron oxide, nitride-based ceramics such as silicon nitride, titanium nitride, and boron nitride, ceramics such as silicon carbide, calcium carbonate, aluminum sulfate, aluminum hydroxide, potassium titanate, talc, kaolin clay, kaolin night, halloysite, pyrophyllite, montmorillonite, sericite, mica, amesite, bentonite, asbestos, zeolite, calcium silicate, magnesium silicate, diatomaceous earth, and silica sand, glass fibers, and fluorides thereof. Examples of such an organic filler include crosslinked polystyrene particles, crosslinked acrylate-based resin particles, crosslinked methyl-methacrylate based particles, fluorine resin particles such as PTFE, and the like. One type of these may be used alone, or two or more types may be used in combination.

The average particle size of the filler is not particularly limited but is preferably not less than 0.1 μm and not greater than 3.0 μm.

The proportion of the filler in the porous layer (mass fraction) is preferably not less than 50% and not greater than 99.99% from the perspective of heat resistance.

A polyolefin or heat-resistant resin described in the section regarding other resin components contained in the first polyolefin resin described above may be suitably used as the resin binder.

The proportion of the amount of resin binder out of the total amount of the filler and the resin binder is preferably not less than 0.5% and not greater than 8% in terms of the volume fraction from the perspective of the binding capacity of both components.

The same heat-resistant resins as those described in the section regarding other resin components contained in the first polyolefin resin described above may be suitably used as the heat-resistant resin.

The method for applying the filler-containing resin solution or heat-resistant resin solution to the surface of the polyolefin multilayer microporous membrane is not particularly limited as long as the method is one with which the required layer thickness or coating area can be achieved. Specific examples include a gravure coater method, a small-diameter gravure coater method, a reverse roll coater method, a transfer roll coater method, a kiss coater method, a dip coater method, a knife coater method, an air doctor coater method, a blade coater method, a rod coater method, a squeeze coater method, a cast coater method, a die coater method, a screen printing method, and a spray coating method.

The solvent for the filler-containing solution or the heat-resistant resin solution is not particularly limited but is preferably a solvent which can be removed from the solution applied to the polyolefin multilayer microporous membrane. Specific examples include N-methylpyrrolidone, N,N-dimethylformamide, N,N-dimethylacetamide, water, ethanol, toluene, heated xylene, methylene chloride, and hexane.

The method for removing the solvent is not particularly limited as long as the method does not have an adverse effect on the polyolefin multilayer microporous membrane. Specific examples include a method of drying the polyolefin multilayer microporous membrane at a temperature lower than or equal to the melting point thereof while immobilizing the polyolefin multilayer microporous membrane, a method of drying the polyolefin multilayer microporous membrane under reduced pressure, and a method of immersing the polyolefin multilayer microporous membrane in a poor solvent of the resin binder or the heat-resistant resin so as to coagulate the resin and simultaneously extract the solvent.

The thickness of the porous layer is preferably not less than 0.5 μm and not greater than 100 μm from the perspective of enhancing the heat resistance.

In the multi-layer porous membrane of this embodiment, the proportion of the thickness of the porous layer relative to the thickness of the multi-layer porous membrane may be adjusted appropriately before use in accordance with the purpose. Specifically, the proportion is preferably not less than 15% and not greater than 80% and more preferably not less than 20% and not greater than 75%.

In addition, the porous layer may be formed on one surface of the multi-layer porous membrane or may be formed on both surfaces thereof.

4. Battery Separator

The polyolefin multilayer microporous membrane of this embodiment can be suitably used in a battery using an aqueous electrolytic solution or a battery using a non-aqueous electrolytic solution. Specifically, the polyolefin multilayer microporous membrane can be preferably used as a separator for a rechargeable battery such as a nickel-hydrogen battery, a nickel-cadmium battery, a nickel-zinc battery, a silver-zinc battery, a lithium rechargeable battery, or a lithium polymer rechargeable battery. Of these, the polyolefin multilayer microporous membrane is preferably used as a separator for a lithium ion rechargeable battery.

In a lithium ion rechargeable battery, a positive electrode and a negative electrode are laminated with a separator interposed therebetween, and the separator contains an electrolytic solution (an electrolyte). The electrode structure is not particularly limited, and a conventionally known structure may be used. For example, an electrode structure in which disc-shaped positive electrode and negative electrode are placed to face each other (coin type), an electrode structure in which planar positive electrodes and negative electrodes are alternately laminated (lamination type), an electrode structure in which a laminated band-shaped positive electrode and negative electrode are wound (winding type), and the like can be employed.

The current collector, positive electrode, positive electrode active material, negative electrode, negative electrode active material, and electrolytic solution used in the lithium ion rechargeable battery are not particularly limited, and conventionally known materials may be appropriately used in combination.

Note that the present invention is not limited to the above embodiments, and various modifications may be added within the scope of the present invention.

WORKING EXAMPLES

The present invention will be described in further detail using examples below, but the embodiments of the present invention are not limited to these examples.

Note that the evaluation methods, each of the analysis methods, and the materials used in the examples are as follows.

1. Evaluation Methods and Analysis Methods (1) Thickness (μm)

The thicknesses of five points of the microporous membrane within a range of 95 mm×95 mm were measured with a contact thickness meter (Litematic manufactured by Mitsutoyo Co., Ltd.), and the average value was determined.

(2) Porosity (%)

The porosity was measured with the following formula, wherein the weight $w_1$ of the microporous membrane and the weight $w_2$ of an equivalent polymer not having pores (polymer having the same width, length, and composition) were compared.

Porosity (%) $(w_2-w_1)/w_2 \times 100$ (3) Air Permeability (sec/100 cm³/16 μm)

The air permeability $P_1$ (sec/100 cm³) measured with an air permeability meter (EGO-1T manufactured by Asahi Seiko Co., Ltd.) in accordance with JIS P-8117 for a multilayer microporous membrane having a thickness $T_1$ (μm) was converted to an air permeability $P_2$ for a thickness of 16 μm using the formula $P_2=(P_1 \times 16)/T_1$.

(4) Maximum Pore Size and Mean Flow Pore Size (Nm)

The maximum pore size and mean flow pore size were measured in the order of Dry-up and Wet-up using a perm porometer (CFP-1500A manufactured by PMI). For Wet-up, pressure was applied to a microporous membrane sufficiently immersed in Galwick (trade name) manufactured by PMI which has a known surface tension, and the pore size converted from the pressure at which air begins to pass through the membrane was used as the maximum pore size.

For the mean flow pore size, the pore size was converted from the pressure at a point of intersection between a curve expressing ½ the slope of a pressure and flow rate curve in the Dry-up measurement and the curve in the Wet-up measurement. The following formula was used for the conversion of pressure and pore size.

$$d=C\gamma/P$$

(In the formula, "d (μm)" is the pore size of the microporous membrane; "γ (mN/m)" is the surface tension of the liquid; "P (Pa)" is the pressure; and "C" is a constant.

(5) Pin Puncture Strength (Gf/16 μm)

A maximum load was measured when a needle 1 mm in diameter with a spherical tip (radius of curvature R: 0.5 mm) was pierced into a microporous membrane with a thickness $T_1$ (μm) at a speed of 2 mm/sec. The measured maximum load $L_1$ (gf) was converted to the maximum load $L_2$ scaled to a 16 μm membrane thickness by the formula: $L_2=(L_1 \times 16)/T_1$, and the pin puncture strength was thereby obtained.

(6) Impedance ($\Omega \cdot cm^2$)

The impedance was measured using an impedance measuring device (SI1250, SI1287 manufactured by Solartron). A microporous membrane with a width of 30 mm and a length of 20 mm and approximately 0.02 mL of a 1 mol/L LiPF$_6$ solution serving as an electrolyte (a mixed solution with a 3:7 volume ratio of ethylene carbonate and ethyl methyl carbonate was used as a solvent) were sandwiched between electrodes having a 30 mm×20 mm Ni foil provided on a glass sheet with a width of 50 mm, a length of 80 mm, and a height of 3 mm, and the impedance was measured. The impedance ($\Omega \cdot cm^2$) was determined under measurement conditions of 1.0 kHz and 10 mA (constant current).

(7) Solution Resistance Increase Rate (%)

An electrochemical cell prepared as described below was charged to 4.2 V, and the impedance between 65 kHz and 0.1 Hz was measured at 10 mA (constant current) using an impedance measuring device (SI1250, SI1287 manufactured by Solartron). Next, for the purpose of an accelerated aging test, the sample was placed in a 80° C. oven for 50 hours under 4.2 V trickle charging conditions, and the impedance was then measured once again under the same conditions.

Figure 1:
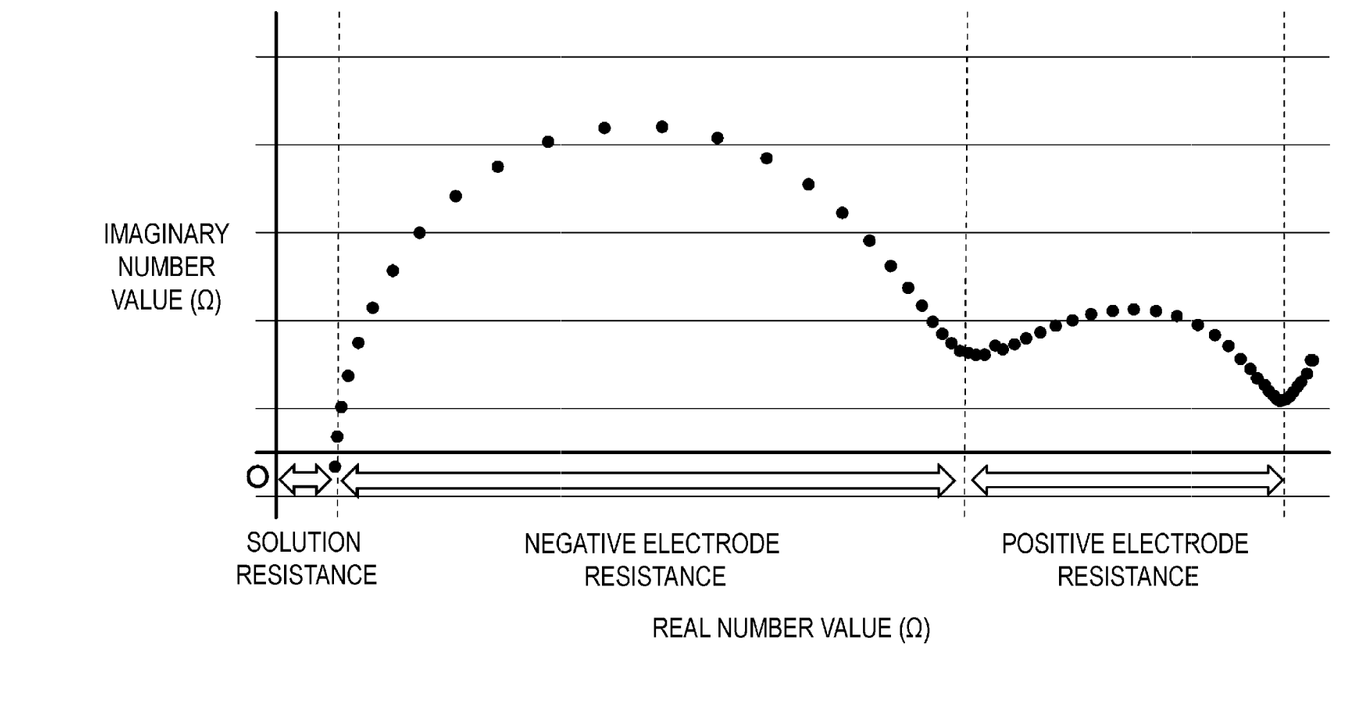
FIG. 1 is a schematic diagram of a Cole-Cole plot of a lithium ion rechargeable battery.

As illustrated in FIG. 1, the frequency characteristics of the measured internal impedance can be expressed in a complex plane diagram (Cole-Cole plot) using a real number as a resistance component and an imaginary number as a reactance component. When the measurement frequency is varied from a high frequency to a low frequency, an impedance trajectory depicting a semicircle in the clockwise direction is obtained. In this trajectory, the first semicircular trajectory is assumed to represent the negative electrode resistance, and the second semicircular trajectory is assumed to represent the positive electrode resistance. In addition, the real number when the imaginary number is 0 is the series resistance component between the polar plates and represents the solution resistance ($\Omega$). The rate of change in the solution resistance ($R_1$) after the oven test with respect to the solution resistance ($R_0$) prior to being placed in the oven was found from the following formula and used as the solution resistance increase rate Rc (%).

$Rc(\%)=(R_1-R_0)/R_0 \times 100$

An increase in solution resistance represents an increase in resistance between the polar plates, so when the solution resistance increase rate is high, the battery capacity may decrease after a charge-discharge cycle test of the battery—that is, the cycle life of the battery may become short. A possible factor contributing to such an increase in solution resistance may be, for example, the accumulation of electrolyte decomposition by-products on the electrode surface, the clogging of the microporous membrane, or the like.

(8) Preparation of Electrochemical Cell

First, 100 parts by mass of lithium cobaltite, 5 parts by mass of acetylene black, and 2 parts by mass of polyvinylidene fluoride were mixed uniformly and applied to an aluminum substrate with a width of 60 mm and a length of 60 mm at a unit area mass of 20 mg/cm² to form a positive electrode. Next, 100 parts by mass of artificial graphite, 1.25 parts by mass of styrene-butadiene rubber, and 3 parts by mass of carboxymethylcellulose were mixed uniformly and applied to a copper substrate with a width of 65 mm and a length of 65 mm at a unit area mass of 9.45 mg/cm² to form a negative electrode.

A microporous membrane with a width of 75 mm and a length of 75 mm and approximately 3 mL of a 1 mol/L LiPF$_6$ solution serving as an electrolyte (a mixed solution with a 3:7 volume ratio of ethylene carbonate and ethyl methyl carbonate was used as a solvent) were sandwiched between the obtained positive and negative electrodes to form a laminate. The obtained laminate was covered with a cladding and sealed with a vacuum seal to produce an electrochemical cell.

(7) Falling Ball Meltdown Temperature

A polyolefin microporous membrane with 50 mm sides was sandwiched using a metal block frame having a hole with a diameter of 12 mm, and a tungsten carbide ball with a diameter of 10 mm was placed on the porous membrane. The porous membrane was placed so as to have a plane in the horizontal direction. The porous membrane was heated at 5° C./min starting from 30° C. The temperature at which the porous membrane was punctured by the ball was measured and used as the meltdown temperature.

(8) Weight Average Molecular Weight (Mw)

The Mw of UHMWPE and HDPE were determined by gel permeation chromatography (GPC) under the following conditions.

Measurement apparatus: GPC-150C, manufactured by Waters Corporation

Column: Shodex UT806M, manufactured by Showa Denko, K. K.

Column temperature: 135° C.

Solvent (mobile phase): o-dichlorobenzene

Solvent flow rate: 1.0 mL/min

Sample concentration: 0.1 wt % (dissolution conditions: 135° C./1 h)

Injection quantity: 500 µL

Detector: differential refractometer manufactured by Waters Corporation (RI detector)

Calibration curve: Created using predetermined conversion constant from calibration curve obtained using monodisperse polystyrene standard sample (9) Heat of Fusion, Melting Point The heat of fusion $\Delta H_m$ was measured by the following procedure in accordance with JIS K7122.

That is, a sample was allowed to stand still in a sample holder of a differential scanning calorimeter (DSC-System 7, manufactured by Perkin Elmer Inc.), and in an nitrogen atmosphere, the resin sample was subjected to heat treatment at 190° C. for 10 minutes, cooled to 40° C. at 10° C./min, maintained at 40° C. for 2 minutes, and then heated to 190° C. at a rate of 10° C./min. A line passing through the point at 85° C. and the point at 175° C. on the DSC curve (melting curve) obtained in the heating process was drawn as a baseline, and the amount of heat (units: J) was calculated from the area of the portion enclosed by the baseline and the DSC curve. This was divided by the weight (units: g) of the sample to determine the heat of fusion $\Delta H_m$ (units: J/g).

In addition, the temperature of the minimum value on a curve of the heat of fusion $\Delta H_m$ and endothermic melting was measured in the same manner as the melting point.

2. Working Examples and Comparative Examples

Working Example 1

(1) Preparation of First Polyolefin Solution

A mixture was prepared by blending 0.2 parts by mass of an antioxidant tetrakis[methylene-3-(3,5-ditertiary butyl-4-hydroxyphenyl)-propionate]methane into 100 parts by mass of a first polyolefin resin containing 20 mass % of a polypropylene having a Mw of $2.0 \times 10^6$ (PP; melting point: 162° C.) and 80 mass % of a high-density polyethylene having a Mw of $5.6 \times 10^5$ (HDPE; density: 0.955 g/cm³, melting point: 135° C.).

Next, 25 parts by mass of the obtained mixture was loaded into a strong kneading type twin-screw extruder (inside diameter: 58 mm, L/D=42), and 75 parts by mass of liquid paraffin [35 cst (40° C.) was fed from the side feeder of the twin-screw extruder and melt-kneaded under conditions at 210° C. and 250 rpm to prepare a first polyolefin solution.

(2) Preparation of Second Polyolefin Solution

A mixture was prepared by blending 0.2 parts by mass of an antioxidant tetrakis[methylene-3-(3,5-ditertiary butyl-4-hydroxyphenyl)-propionate]methane into 100 parts by mass of a second polyolefin resin containing 40 mass % of an ultrahigh molecular weight polyethylene having a Mw of $2.0 \times 10^6$ (UHMwPE) and 60 mass % of a high-density polyethylene having a Mw of $5.6 \times 10^5$ (HDPE; density: 0.955 g/cm³).

Next, 25 parts by mass of the obtained mixture was loaded into a separate twin-screw extruder of the same type as that described above, and 75 parts by mass of liquid paraffin [35 cst (40° C.)] was fed from the side feeder of the twin-screw extruder and melt-kneaded under the same conditions as those described above to prepare a second polyolefin solution.

(3) Extrusion

The first and second polyolefin solutions were fed from each twin-screw extruder to a three-layer T-die and extruded so that the layer thickness ratio of the first polyolefin solution/second polyolefin solution/first polyolefin solution was 10/80/10. The extrudate was cooled while being drawn at a drawing rate of 2 m/min with a cooling roller adjusted to a temperature of 30° C. so as to form a gel-like three-layer sheet.

(4) First Stretching, Removal of Solvent for Membrane Formation, and Drying

The gel-like three-layer sheet was subjected to simultaneous biaxial stretching (first stretching) to a magnitude of 5 in both the MD direction and the TD direction at 116° C. with a tenter stretching machine. The stretched gel-like three-layer sheet was fixed to a 20 cm×20 cm aluminum frame sheet and immersed in a methylene chloride bath adjusted to a temperature of 25° C. The liquid paraffin was removed while shaking for 3 minutes at 100 rpm, and the sheet was air-dried at room temperature.

(5) Second Stretching, Heat Setting

The dried membrane was stretched to a magnitude of 1.4 in the TD direction at 126° C. using a batch-type stretching machine (second stretching). Next, this membrane was subjected to heat setting treatment at 126° C. with a tenter method.

The compounding ratio of each component of the prepared polyolefin three-layer microporous membrane, the production conditions, the evaluation results, and the like are shown in Table 1.

Working Examples 2 and 3 and Comparative Examples 1 to 7

In Working Examples 2 and 3 and Comparative Examples 1, and 3 to 7, polyolefin three-layer microporous membranes/single-layer microporous membranes were prepared under the same conditions as those of Working Example 1 with the exception of the conditions shown in Table 1. Note that in Comparative Example 2, a polyolefin three-layer microporous membrane was prepared under the conditions described in Table 1 and using the same conditions as those of Working Example 1 with the exception that the drawing rate of the extrudate with the cooling roll was set to 1.5 m/min. The compounding ratio of each component of the prepared polyolefin three-layer microporous membrane, the production conditions, the evaluation results, and the like are shown in Table 1.

TABLE 1

|  |  |  | Working Example 1 | Working Example 2 | Working Example 3 | Working Example 4 |
|---|---|---|---|---|---|---|
| First layer | UHMwPE | Mass % | — | — | — | — |
|  | HDPE |  | 80 | 80 | 50 | 90 |
|  | PP(D) |  | 20 | 20 | 50 | 10 |
|  | Resin/solvent | Parts by mass | 25/75 | 25/75 | 30/70 | 25/75 |
| Second layer | UHMwPE | Mass % | 40 | 40 | 40 | 40 |
|  | HDPE |  | 60 | 60 | 60 | 60 |
|  | PP |  | — | — | — | — |
|  | Resin/solvent | Parts by mass | 25/75 | 25/75 | 27.5/72.5 | 23/77 |
| Layer structure (Skin/Core/Skin) |  |  | 1/2/1 | 1/2/1 | 2/1/2 | 2/1/2 |
| Layer ratio (Skin/Core/Skin) |  |  | 10/80/10 | 7.5/85/7.5 | 40/20/40 | 40/20/40 |
| PP ratio (A) in multilayer structure (%) |  |  | 4 | 3 | 10 | 2 |
| First stretching magnification (MD × TD) (B) |  |  | 25 | 25 | 25 | 25 |
| Gel sheet stretching temperature (° C.) |  |  | 116 | 115 | 114 | 117 |
| Second stretching magnification (C) |  |  | 1.4 | 1.4 | 1.5 | 1.4 |
| A/B × C |  |  | 0.11 | 0.09 | 0.27 | 0.06 |
| D/B × C |  |  | 0.57 | 0.57 | 1.33 | 0.29 |
| Physical properties | Thickness | μm | 12 | 12 | 12 | 12 |
|  | Porosity | % | 46 | 46 | 53 | 43 |
|  | Porosity/thickness | — | 3.83 | 3.83 | 4.45 | 3.58 |
|  | Maximum pore size | nm | 47 | 46 | 30 | 48 |
|  | Mean flow pore size | nm | 31 | 30 | 22 | 34 |
|  | Maximum/average size | — | 1.52 | 1.53 | 1.36 | 1.41 |
|  | Air permeability | sec | 130 | 136 | 152 | 115 |
|  | Converted air permeability | sec/16 μm | 173 | 181 | 203 | 153 |
|  | Pin puncture strength | gf | 320 | 348 | 347 | 305 |
|  | Converted pin puncture strength | gf/16 μm | 427 | 464 | 463 | 407 |
|  | Impedance | Ω·cm² | 6.2 | 6.3 | 7.1 | 7.2 |
|  | Meltdown temperature | ° C. | 175 | 172 | 188 | 152 |
|  | Solution resistance increase rate | % | 60 | 53 | 65 | 48 |

TABLE 2

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| First layer | UHMwPE | Mass % | 30 | — | — | — | — | — | 15 |
|  | HDPE |  | 60 | 40 | 50 | 30 | — | — | 75 |
|  | PP(D) |  | 10 | 60 | 50 | 70 | — | — | 10 |
|  | Resin/solvent | Parts by mass | 30/70 | 25/75 | 25/75 | 25/75 | — | — | 25/75 |
| Second layer | UHMwPE | Mass % | 40 | 30 | 30 | 30 | 40 | 20 | — |
|  | HDPE |  | 60 | 70 | 70 | 70 | 60 | 80 | — |
|  | PP |  | — | — | — | — | — | — | — |
|  | Resin/solvent | Parts by mass | 25/75 | 28.5/71.5 | 28.5/71.5 | 25/75 | 25/75 | 25/75 | — |
| Layer structure (Skin/Core/Skin) |  |  | 2/1/2 | 2/1/2 | 1/2/1 | 1/2/1 | — | — | — |
| Layer ratio (Skin/Core/Skin) |  |  | 40/20/40 | 40/20/40 | 10/80/10 | 7.5/85/7.5 | — | — | — |
| PP ratio (A) in multilayer structure (%) |  |  | 2 | 12 | 10 | 11 | 0 | 0 | 10 |
| First stretching magnification (MD × TD) (B) |  |  | 25 | 25 | 25 | 25 | 25 | 25 | 25 |
| Gel sheet stretching temperature (° C.) |  |  | 114 | 118 | 116 | 116 | 118 | 115 | 118 |
| Second stretching magnification (C) |  |  | 1.5 | 1.5 | 1.0 | 1.4 | 1.4 | 1.4 | 1.4 |
| A/B × C |  |  | 0.05 | 0.32 | 0.40 | 0.30 | — | — | 0.29 |
| D/B × C |  |  | 0.27 | 1.60 | 2.00 | 2.00 | — | — | 0.29 |
| Physical properties | Thickness | μm | 14 | 20 | 18 | 14 | 12 | 14 | 12 |
|  | Porosity | % | 41 | 52 | 45 | 42 | 39 | 45 | 39 |
|  | Porosity/thickness | — | 2.96 | 2.60 | 2.50 | 3.00 | 3.25 | 3.21 | 3.25 |
|  | Maximum pore size | nm | 40 | 22 | 25 | — | 55 | 80 | 70 |
|  | Mean flow pore size | nm | 27 | 17 | 17 | — | 37 | 54 | 46 |
|  | Maximum/average size | — | 1.48 | 1.29 | 1.47 | — | 1.49 | 1.48 | 1.52 |
|  | Air permeability | sec | 250 | 468 | 380 | 837 | 160 | 100 | 100 |
|  | Converted air permeability | sec/16 μm | 286 | 374 | 338 | 957 | 213 | 114 | 133 |

TABLE 2-continued

|  |  | Comparative Example 1 | Comparative Example 2 | Comparative Example 3 | Comparative Example 4 | Comparative Example 5 | Comparative Example 6 | Comparative Example 7 |
| --- | --- | --- | --- | --- | --- | --- | --- | --- |
| Pin puncture strength | gf | 509 | 431 | 438 | 397 | 340 | 265 | 289 |
| Converted pin puncture strength | gf/16 μm | 582 | 345 | 389 | 454 | 453 | 303 | 385 |
| Impedance | $\Omega \cdot cm^2$ | 7.5 | 8.0 | 7.9 | — | 7.4 | 6.4 | 7.7 |
| Meltdown temperature | ° C. | 152 | 182 | 181 | — | 151 | 151 | 150 |
| Solution resistance increase rate | % | 288 | — | — | — | 241 | 214 | — |

3. Evaluation

The polyolefin multilayer microporous membranes of Working Examples 1 to 4 exhibited good values with a thickness of 12 μm, a porosity/thickness of not less than 3.0, and an impedance of not greater than 7.5 $\Omega \cdot cm^2$. Therefore, the electrolyte retention characteristics are good when used as a battery separator, and an increased battery capacity and increased output can be anticipated.

In particular, in Working Examples 1 to 3, the polypropylene content in the polyolefin multilayer microporous membrane is not less than 2.5 mass %, and the membranes have a meltdown temperature of not lower than the melting point of the polypropylene that was used (162° C.), which demonstrates excellent heat resistance.

In addition, as a result of performing accelerated aging tests using the polyolefin multilayer microporous membranes of Working Examples 1 to 4 as battery separators, the solution resistance increase rates exhibited low values of not less than 48% and not greater than 65%. The solution resistance increase rate represents the resistance increase rate between polar plates, so an enhancement in the cycle life of the batter can be anticipated when the polyolefin multilayer microporous membranes of Working Examples 1 to 4 are used as battery separators.

This may be because the polyolefin multilayer microporous membranes of Working Examples 1 to 4 had a porosity/thickness of not less than 3.0, a maximum pore size of not greater than 55 nm, and a mean flow pore size of not less than 20 nm, the membranes exhibited excellent impedance or air permeability, and it was possible to uniformly disperse the ion pathways in the in-plane direction of the separators, so local clogging or dendrite growth was suppressed.

On the other hand, since the polyolefin multilayer microporous membrane of Comparative Example 1 contains a polypropylene and a relatively large amount of ultrahigh molecular weight polyethylene in the first microporous layer, the porosity and the converted air permeability were diminished. In addition, the porosity/thickness of the polyolefin multilayer microporous membrane of Comparative Example 1 was low at 2.96, and the impedance increased in comparison to the working examples.

Furthermore, when the polyolefin multilayer microporous membrane of Comparative Example 1 was used as a battery separator, the solution resistance increase rate markedly increased to 288%. This suggests that when the polyolefin multilayer microporous membrane of Comparative Example 1 is used as a battery separator, the cycle life of the battery is diminished in comparison to when the polyolefin multilayer microporous membranes of the working examples are used as battery separators.

In the polyolefin multilayer microporous membrane of Comparative Example 2, the thickness was 20 μm, and the porosity/thickness was a low value. In addition, the converted air permeability increased dramatically, and the impedance was also high. This may be because the pore size (maximum pore size, mean flow pore size) becomes small and the through-holes are blocked since the content of the polypropylene in the multilayer microporous membrane (first microporous layer) is large.

In the polyolefin multilayer microporous membrane of Comparative Example 3, the membrane was 18 μm, and the porosity/thickness was a low value. In addition, the value of the converted air permeability and the impedance were high in spite of the polypropylene content being lower than that of Comparative Example 2. This may be because the pore size (maximum pore size, mean flow pore size) becomes small and the through-holes are blocked since the stretching magnification in the second stretching step was 1.0 and A/(B×C) exceeded 0.35.

Note that even when the polyolefin multilayer microporous membrane obtained in Comparative Example 3 was stretched further to adjust the thickness to from 12 to 14 μm, the porosity decreased further, so the impedance did not improve. Even when such a microporous membrane is used as a battery separator, an enhancement in battery output and capacity cannot be anticipated.

In the polyolefin multilayer microporous membrane of Comparative Example 4, the thickness was 14 μm and the porosity/thickness was not less than 3. However, the polypropylene content in the first microporous membrane was high, and D/(B×C) was not less than 1.7, so the value of the converted air permeability was an extremely large value.

Comparative Examples 5 and 6 are single-layer microporous membranes having a thickness of from 12 to 14 μm and not containing polypropylene, so the meltdown temperature was low. When used as a battery separator, the heat resistance was poor, resulting in a low safe temperature range of the battery. In addition, in Comparative Example 6, the ultrahigh molecular weight polyethylene content was low, so the maximum pore size was large, and the converted air permeability and impedance were good. However, when used as a battery separator, it is presumed that the cycle life of the battery will be inferior, as described below.

Furthermore, when the polyolefin multilayer microporous membranes of Comparative Examples 5 and 6 were used as battery separators, the solution resistance increase rate markedly increased to from 214 to 241%. This suggests that when the polyolefin multilayer microporous membranes of Comparative Examples 5 and 6 are used as battery separators, the cycle life of the battery is diminished in comparison to when the polyolefin multilayer microporous membranes of the working examples are used as battery separators.

Comparative Example 7 is a single-layer microporous membrane having a thickness of 12 μm and containing a polypropylene and an ultrahigh molecular weight polyethylene. As in Comparative Example 1, poor polypropylene dispersibility was observed, and the appearance of the microporous membrane was also poor. In addition, although the polypropylene content was 10 mass % in the microporous membrane, the meltdown temperature decreased, the maximum pore size increased, and the impedance increased. This may be caused by the fact that a uniform fibril network of polypropylene and polyethylene is not formed.

The invention claimed is:

1. A polyolefin multilayer microporous membrane comprising:
    a first microporous layer comprising a first polyolefin resin containing a polypropylene; and
    a second microporous layer comprising a second polyolefin resin containing an ultrahigh molecular weight polyethylene,
    wherein a thickness of the multilayer microporous membrane is not greater than 25 µm,
    wherein an air permeability of the multilayer microporous membrane in terms of a membrane thickness of 16 µm is not less than 100 sec/100 cm³/16 µm and not greater than 300 sec/100 cm³/16 µm,
    wherein an impedance of the multilayer microporous membrane is less than 7.5 Q·cm², wherein a weight average molecular weight (Mw) of the polypropylene is not less than $1 \times 10^6$ and not greater than $4 \times 10^6$,
    wherein the content of the polypropylene in the first microporous layer having a Mw of $5 \times 10^4$ is not greater than 5 mass %, and
    wherein the thickness in urn and a porosity in % of the multilayer microporous membrane satisfy the relationship: porosity/thickness >3.5.

2. The polyolefin multilayer microporous membrane according to claim 1, wherein a content of the polypropylene in the polyolefin multilayer microporous membrane is not less than 2.0 mass % of the total of the first and second polyolefin resins.

3. The polyolefin multilayer microporous membrane according to claim 1, wherein the first polyolefin resin contains a polypropylene in an amount of not less than 10 mass % and not greater than 55 mass % and a high-density polyethylene in an amount of not less than 45 mass % and not greater than 90 mass %, wherein the second polyolefin resin contains an ultrahigh molecular weight polyethylene in an amount of not less than 10 mass % and not greater than 60 mass % and a high-density polyethylene in an amount of not less than 40 mass % and not greater than 90 mass %.

4. The polyolefin multilayer microporous membrane according to claim 1, wherein a maximum pore size as measured with a perm porometer is not less than 5 nm and not greater than 55 nm.

5. The polyolefin multilayer microporous membrane according to claim 1, wherein a mean flow pore size as measured with a perm porometer is not less than 20 nm.

6. The polyolefin multilayer microporous membrane according to claim 1, wherein a pin puncture strength in terms of a membrane thickness of 16 µm is not less than 250 gf/16 µm.

7. The polyolefin multilayer microporous membrane according to claim 1, wherein a meltdown temperature according to a falling ball test method is not lower than 150° C. and not higher than 190° C.

8. The polyolefin multilayer microporous membrane according to claim 1, further comprising an inorganic filler and/or a heat-resistant resin on at least one surface of the polyolefin multilayer microporous membrane.

9. The polyolefin multilayer microporous membrane according to claim 1, wherein the thickness of the multilayer microporous membrane is not greater than 16 µm.

10. A battery separator comprising a polyolefin multilayer microporous membrane, wherein the polyolefin multilayer microporous membrane comprises:
    a first microporous layer comprising a first polyolefin resin containing a polypropylene; and
    a second microporous layer comprising a second polyolefin resin containing an ultrahigh molecular weight polyethylene,
    wherein a thickness of the multilayer microporous membrane is not greater than 25 µm,
    wherein an air permeability of the multilayer microporous membrane in terms of a membrane thickness is not less than 100 sec/100 cm³/16 pm and not greater than 300 sec/100 cm³/16 pm,
    wherein an impedance of the multilayer microporous membrane is less than Q·cm²,
    wherein a weight average molecular weight (Mw) of the polypropylene is not less than $1 \times 10^6$ and not greater than $4 \times 10^6$, and
    wherein the content of the polypropylene in the first microporous layer having a Mw of $5 \times 10^4$ is not greater than 5 mass %, and
    wherein the thickness in urn and a porosity in % of the multilayer microporous membrane satisfy the relationship: porosity/thickness >3.5.

11. The battery separator of claim 10, wherein the polyolefin multilayer microporous membrane further comprises an inorganic filler and/or a heat-resistant resin on at least one surface of the polyolefin multilayer microporous membrane.

12. A method of manufacturing the polyolefin multilayer microporous membrane of claim 1, the method comprising:
    (1) preparing a first polyolefin solution by melt-kneading the first polyolefin resin containing the polypropylene and a solvent;
    (2) preparing a second polyolefin solution by melt-kneading the second polyolefin resin containing the ultrahigh molecular weight polyethylene and the solvent;
    (3) coextruding the first and second polyolefin solutions to form a multilayer sheet and subsequently cooling the multilayer sheet to form a gel-like multilayer sheet;
    (4) performing a first stretching step of stretching the gel-like multilayer sheet at a temperature not less than 112° C. and not greater than 117° C. to form a stretched multilayer sheet;
    (5) removing the solvent from the stretched multilayer sheet after performing the first stretching step;
    (6) drying the stretched multilayer sheet after removing the solvent; and
    (7) performing a second stretching step of stretching the stretched multilayer sheet after the drying.

13. The method according to claim 12, wherein a stretching magnification (B) in the first stretching step and a stretching magnification (C) in the second stretching step satisfy the relationship $0.01 \leq A/(B \times C) \leq 0.35$,
wherein A is a content of polypropylene in the polyolefin multilayer microporous membrane with respect to a total of 100 mass % of the first and second polyolefin resins in the polyolefin multilayer microporous membrane.

* * * * *